United States Patent
Brisson et al.

(10) Patent No.: US 12,222,168 B2
(45) Date of Patent: Feb. 11, 2025

(54) DRAWN POLYMER FIBERS FOR USE IN THERMAL APPLICATIONS

(71) Applicant: Massachusetts Institute of Technology, Cambridge, MA (US)

(72) Inventors: John G. Brisson, Rockport, MA (US); Kyle J. Thompson, Lynnfield, MA (US); John Cummings, Stoneham, MA (US); Jacob Lazer Adams, McLean, VA (US); Lauren Cantley, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 340 days.

(21) Appl. No.: 17/375,182

(22) Filed: Jul. 14, 2021

(65) Prior Publication Data

US 2023/0020829 A1 Jan. 19, 2023

(51) Int. Cl.
*F28F 1/02* (2006.01)
*B29C 55/22* (2006.01)
(Continued)

(52) U.S. Cl.
CPC ............. *F28F 1/022* (2013.01); *B29C 55/22* (2013.01); *F28F 7/02* (2013.01); *F28F 21/06* (2013.01);
(Continued)

(58) Field of Classification Search
CPC ........ F28F 1/022; F28F 21/06; F28F 2260/02; F28F 21/062; F28F 7/02; F28D 7/103;
(Continued)

(56) References Cited

U.S. PATENT DOCUMENTS

| 813,918 | A | * | 2/1906 | Schmitz | ................. F28D 7/103 |
| | | | | | 428/596 |
| 1,542,842 | A | * | 6/1925 | Schenck | ................... F28D 7/12 |
| | | | | | 165/142 |

(Continued)

FOREIGN PATENT DOCUMENTS

| CZ | 2016487 A3 | 2/2018 | |
| GB | 2581827 A | * 9/2020 | ............ A61M 25/00 |

OTHER PUBLICATIONS

Niblick et al., "High Effectiveness Micro-Tube Recuperators for Low-Capacity Turbo-Brayton Cryocoolers for Space," Brayton Cooler Development, Paper No. 4.3; 1 Page.
(Continued)

*Primary Examiner* — Jianying C Atkisson
*Assistant Examiner* — For K Ling
(74) *Attorney, Agent, or Firm* — Daly, Crowley, Mofford & Durkee, LLP

(57) ABSTRACT

Drawn polymer fibers have internal channels running, at least partially, through the length of the fibers. These fibers may be configured to for use as thermal isolators that can thermally isolate material at the central core of the fiber from the outside environment. In such instances, the channels may be used as insulating channels and/or a heating or cooling fluid can be pumped through the channels to maintain the temperature of the material at the inner core. As another application, the fibers may be used as recuperative, regenerative, parallel-flow, counter-flow, cross-flow or condenser/evaporator heat exchangers. In this case, the channels may be used to direct fluid flow. The fiber may allow for the exchange of heat between fluids in the channels.

27 Claims, 13 Drawing Sheets

(51) Int. Cl.
- B29L 31/18 (2006.01)
- F28F 7/02 (2006.01)
- F28F 21/06 (2006.01)
- B29K 69/00 (2006.01)
- B29K 79/00 (2006.01)

(52) U.S. Cl.
CPC .... *B29K 2069/00* (2013.01); *B29K 2079/085* (2013.01); *B29L 2031/18* (2013.01); *F28F 2255/06* (2013.01); *F28F 2260/02* (2013.01)

(58) Field of Classification Search
CPC .. F28D 7/12; B29C 55/22; F16L 11/20; F16L 11/22; A61B 18/02; F61B 18/0218
See application file for complete search history.

(56) References Cited

U.S. PATENT DOCUMENTS

| | | | |
|---|---|---|---|
| 4,202,336 A | | 5/1980 | Van Gerven |
| 4,516,632 A | | 5/1985 | Swift et al. |
| 5,275,595 A | * | 1/1994 | Dobak, III ............. A61B 18/02 |
| | | | 606/23 |
| 5,400,602 A | * | 3/1995 | Chang ................... F16L 59/141 |
| | | | 62/50.7 |
| 5,624,392 A | * | 4/1997 | Saab ................. A61M 25/1029 |
| | | | 604/113 |
| 6,415,860 B1 | | 7/2002 | Kelly et al. |
| 6,547,784 B1 | | 4/2003 | Thompson et al. |
| 7,014,835 B2 | | 3/2006 | Mathias et al. |
| 7,156,159 B2 | | 1/2007 | Lovette et al. |
| 7,203,064 B2 | | 4/2007 | Mongia et al. |
| 2004/0024392 A1 | * | 2/2004 | Lewis .................... A61B 18/02 |
| | | | 606/22 |
| 2005/0113893 A1 | * | 5/2005 | Saab ....................... A61F 7/123 |
| | | | 604/113 |
| 2006/0201180 A1 | * | 9/2006 | Kidwell .................. F24T 10/17 |
| | | | 165/45 |
| 2008/0114347 A1 | | 5/2008 | Devens et al. |
| 2009/0014163 A1 | * | 1/2009 | Thomas .................. F16L 53/32 |
| | | | 165/154 |
| 2013/0276436 A1 | * | 10/2013 | Jensen ...................... F28D 7/12 |
| | | | 60/303 |
| 2013/0277959 A1 | * | 10/2013 | Barthel ................... F16L 53/32 |
| | | | 285/41 |
| 2016/0155534 A1 | | 6/2016 | Fink et al. |
| 2017/0007310 A1 | * | 1/2017 | Rajagopalan .... A61B 17/00234 |
| 2018/0141274 A1 | | 5/2018 | Fink et al. |
| 2022/0010981 A1 | | 1/2022 | Narayanan et al. |

OTHER PUBLICATIONS

Brisson et al., "Drawn Plastic Heat Exchangers," MIT, Jun. 17, 2020; 16 Pages.

Thompson et al., "Miniature Cryocooler: FY19 Advanced Devices Line-Supported Program," MIT Lincoln Laboratory Project Report LSP-280, Jan. 13, 2020; 37 Pages.

Kroulikova et al.; "Comparison of a Novel Polymeric Hollow Fiber Heat Exchanger and a Commercially Available Metal Automotive Radiator"; Polymers; vol. 13; Apr. 6, 2021; 13 Pages.

Tseng et al.; "Mass Production and Applications of Polymeric Hollow-Fibers Heat Exchangers"; SF Journal of Material and Chemical Engineering; vol. 2, No. 1; Feb. 11, 2019; 7 Pages.

"Polymeric Heat Exchangers with Hollow Fibres"; Heat Transfer and Fluid Flow Laboratory; http://www.heatlab.cz/research/polymeric-heat-exchangers-with-hollow-fibres/; 8 Pages.

"Advancing Microchannel Technology in Heat Exchangers and Heat Management Devices"; Western Cooling Efficiency Center; https://wcec.ucdavis.edu/solar-supercritical-co2-thermal-and-energy-enhancement-laboratory-steel/: 7 Pages.

* cited by examiner

DRAWN POLYMER FIBERS FOR USE IN THERMAL APPLICATIONS

STATEMENT REGARDING FEDERAL FUNDING FEDERALLY SPONSORED RESEARCH

This invention was made with government support under FA8702-15-D-0001 awarded by the U.S. Air Force. The government has certain rights in the invention.

FIELD

This disclosure relates to polymer fiber and, more particularly, to drawn polymer fiber with thermal applications.

BACKGROUND

Drawn polymer fiber is used in a wide range of applications, from medical braiding, to strengthening industrial belts, to instrument and racquet strings, to fishing line. The drawing process generally includes heating a stock preform from a polymer then extruding or pulling the heated preform to draw it into the form of a fiber, making it thinner and longer. In typical applications, the drawn fiber is a monofilament. However, drawn fiber with more complex, application specific structures may provide useful benefits.

SUMMARY

In addition to the applications described above, drawn polymer fibers can constructed for use in various thermal applications. One such application uses drawn polymer fibers as heat exchangers. For example, a fiber with longitudinal internal channels (e.g. mesoscopic channels) can carry heat exchanging fluids through those channels. The heat exchange can be transverse, across the fiber, in a counterflow, co-flow, or cross-counter flow arrangement or longitudinal, along the fiber as a convection loop or heat pipe. Another suitable application is thermal isolation. The channels running along the length of a fiber can have a thermally insulating characteristic, separating the material inside the fiber from the external environment. Such thermally insulating channels may be partially or wholly filled with a fluid (e.g. air-filled, gas-filled, liquid-filled), may be evacuated or may be partially or wholly filled with a thermally insulative material (e.g. a liquid, solid or a gel) to thermally isolate one part of the fiber from another part of the fiber or to thermally isolate one portion of the fiber from an outside environment. For example, in embodiments, thermally insulating channels may be disposed about a center portion of a fiber. In embodiments, thermally insulating channels may be disposed about a center portion of a fiber so as to thermally insulate the center portion of the fiber from an outside environment.

When using a fiber as a recuperative heat exchanger (e.g. a counter-flow heat exchanger, a parallel-flow heat exchanger, a cross-flow heat exchanger, a condenser or evaporator heat exchanger, or the like), gas or fluid can release heat as it is pumped or otherwise passed through channels within the fiber in one direction, then allowed to absorb heat and return through another channel in the fiber in the opposite direction. In another embodiment, fibers can be used as a regenerative heat exchanger where an oscillating working fluid will flow though certain channels or around the exterior of the fiber and exchange heat with a static fluid trapped or adsorbed in other channels. Both embodiments of heat exchanger finds use in cryogenic refrigeration applications, in part, because of the small size of the fluid channels. Heat exchangers with channel dimensions on the order of 100 μm, for example, allow for an increase in the heat transfer area/volume ratio which makes the heat exchanger lighter and more compact.

Conventionally, microchannel recuperative heat exchangers are manufactured by photochemically etching the flow channels on glass, silicon, or metals.

However, using drawn polymer fibers to provide microchannel heat exchangers can provide advantages. The thermally drawn manufacturing process allows for a preform to be machined using conventional techniques at the mm or larger scale, and then reduced to the μm scale through the draw process, while maintaining identical internal structure. This makes the machining techniques easier and less expensive. Further, heat exchangers constructed with drawn fiber may be significantly lighter, more effective, and less expensive to manufacture than their conventional equivalents.

Polymers have several other advantages when used in heat exchange applications. For example, the low thermal conductivity of the polymer fiber is advantageous in some MEMS style cryocoolers. Axial conduction is lower in polymers (0.3 W/m-K) with respect to glass (1 W mK). Additionally, in ultra-cold cryogenic recuperators operating at 500 mK and below, polymers exhibit a comparatively lower acoustic mismatch or Kapitza resistance with helium (which may be used as the heat transfer medium) than metals do.

As mentioned above, another thermal application that can utilize drawn polymer fiber is thermal isolation. A drawn fiber can be constructed with an inner core surrounded by thermally isolating channels. The inner core may be an opening through which a wire, another fiber, or other type of material can the positioned or otherwise disposed or it may be a polymer core formed during the drawing process. The channels surrounding the core can be filled with thermally insulating material, radiation (e.g. thermal radiation) shielding, or a vacuum to isolate the inner core from the environment surrounding the fiber.

The fiber can also transport heat along the longitudinal axis, as a heat pipe or convection loop, to create a thermal link between two surfaces. In this incantation, an isolated liquid will exchange heat with an outside source to lower its temperature to near that of the outside source. The aliquot of isolated liquid will then travel along the length of the fiber to a location that has a higher temperature than the liquid and absorb the heat from interface. The now warmed liquid will then be isolated driven back to the original cold source. This loop will be driven to remove heat energy from the warm side of the fiber and deposit it on the cold side of the fiber.

Thermal isolation of the fiber can be useful, for example, in communication applications. Temperature control of communication wire (or fiber) can be critical to the performance of the communication wire because fluctuations in temperature of a wire or optical fiber can disrupt communication by changing properties of the wire or fiber. A drawn fiber having a structure that includes thermal isolation of a communication wire or fiber at its inner core can provide a cost effective and convenient way of maintaining the temperature of the fiber, thus allowing the fiber to be conveniently used such applications.

In general, polymers may provide advantages in heat exchange and thermal isolation applications when compared with other materials. For example, polymer fibers are low cost, flexible, lightweight, resistive to corrosive working fluids that could degrade metals, have low thermal conductivity to minimize axial conduction, and have a comparatively smaller Kapitza resistance at 500 mK and below.

In an embodiment, A drawn fiber that exhibits at least some or all of the advantages described above comprises: A) a first wall comprising a polymer, the first wall defining an opening in the drawn fiber; B) a second wall comprising a polymer, the second wall concentrically surrounding the first wall; C) one or more supporting structures coupled between the first wall and the second wall, the one or more support structures configured to space the central opening from the second polymer wall to create one or more channels between an inner surface of the second polymer wall and an outer surface of the first polymer wall.

One or more of the following features may be included:

The drawn fiber may include a third polymer wall concentrically surrounding the second wall.

The drawn fiber may include one or more second supporting structures coupled between the second wall and the third polymer wall, the one or more second support structures configured to space the third polymer wall from the second wall to create one or more insulating channels between an inner surface of the third polymer wall and an outer surface of the second wall.

The drawn fiber may include a thermally reflective material disposed on a surface of the first wall.

The thermally reflective material may be disposed on the surface the first wall distal to the opening.

The thermally reflective material may be disposed the surface of the first wall proximal to the opening.

The channels may be configured such that a vacuum may be established in the at least one of the one or more of the channels.

The channels may be configured to contain a fluid or gas.

The first wall may have a circular cross-sectional shape.

The first wall may have a rectangular cross-sectional shape.

The support structures may be spaced evenly about the first wall.

The first wall may comprise or surround a cryogenic fiber.

The first wall may comprises or surround a conductive wire.

In another embodiment, a drawn fiber includes: A) a central section provided from a polymer; B) plurality of polymer walls concentrically nested around the central section; C) a plurality of first supporting structures coupled between the central section and an inner polymer wall of the plurality of nested polymer walls, the first supporting structures configured to space the central section from the first polymer wall to create one or more insulating channels between an inner surface of the first polymer wall and an outer surface of the central section; and D) a plurality of second supporting structures coupled between adjacent polymer walls of the nested polymer walls, the second supporting structures configured to space the adjacent polymer walls to create one or more insulating channels between the adjacent polymer walls.

One or more of the following features may be included:

At least one of the plurality of nested polymer walls may have an inner surface and an outer surface, and the supporting structures coupled to the inner surface are offset from supporting structures coupled to the outer surface.

At least one of the plurality of nested polymer walls may have an inner surface and an outer surface, and the supporting structures coupled to the inner surface are in line with the supporting structures coupled to the outer surface.

The plurality of nested polymer walls and the insulating channels may provide thermal insulation between an outer surface of the drawn fiber and the central section.

The thermal insulation may allow the central section to be used as a cryogenic fiber.

The thermal insulation may allow the central section to be used as a superconducting wire.

At least one of the nested polymer walls may include a thermally reflective material coupled to a surface of the at least one of the nested polymer walls.

In another embodiment, a drawn fiber includes: a central fiber section; and at least one wall concentrically nested around the central fiber section; and means for thermally isolating the central fiber section from an outer surface of the drawn fiber.

In another embodiment, heat exchanger includes: a drawn fiber having a first end and a second end, the drawn fiber comprising: one or more fluid delivery channels disposed along a length of the drawn fiber between the first and second ends and the one or more fluid delivery channels configured to carry a fluid having a first temperature from the first end to the second end; and one or more fluid return channels disposed along the length of the drawn fiber and with at least some of the fluid return channels extending between the first and second ends and configured to return a fluid from the second end of the drawn fiber.

One or more of the following features may be included:

The fluid delivery channels may have a first size and shape which define a first cross-sectional area and the fluid return channels may have a second size and shape which define a second cross-sectional area.

The first cross-sectional area may be different from the second cross-sectional area.

The heat exchanger may be a regenerative heat exchanger.

The heat exchanger may be a recuperative heat exchanger.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

Figure 1A:
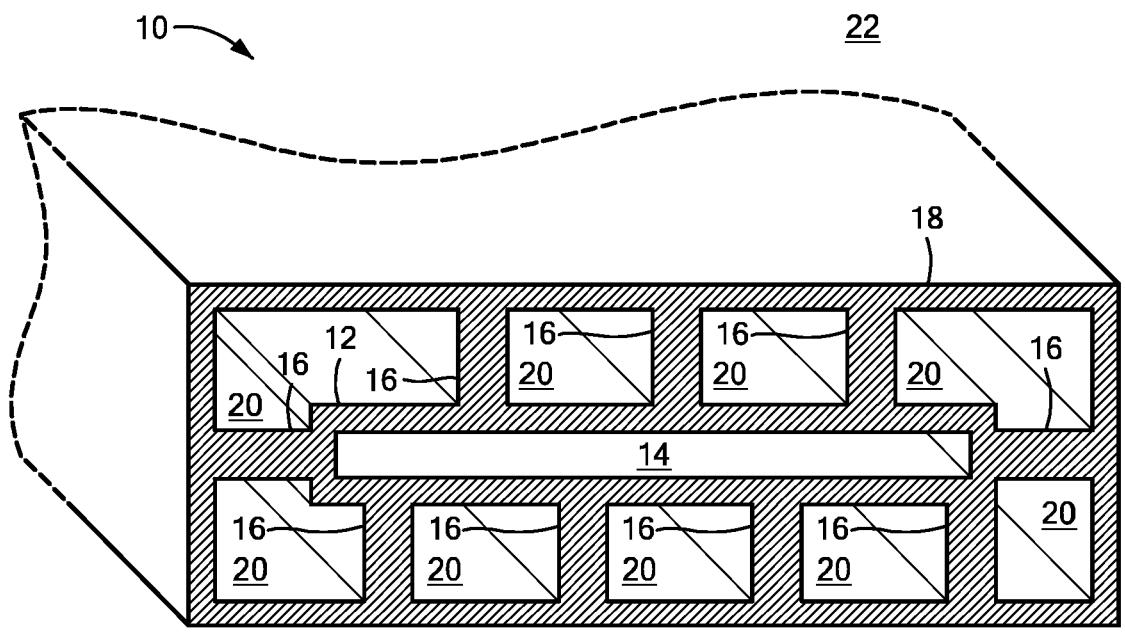
FIG. 1A is a cross-sectional isometric view of an illustrative drawn fiber including a central opening.

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture or an article, that comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e. one, two, three, four, etc. The term "plurality" indicates any integer number greater than one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether or not explicitly described.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Referring now to FIG. 1A, a drawn fiber 10 comprises a multi-channel structure (e.g. mesoscopic channels) with at least one of the channels having a thermally isolating characteristic. That is, at least one channel thermally isolates another portion or channel of the fiber from an outside (or external) environment 22. The external environment may be any environment external to an outermost wall of the fiber portion to be isolated (e.g. if region 14 is to be thermally isolated then the external environment may be an environment external to wall 12 or wall 18). In embodiments, the fiber 10 is made from a polymer such as polyetherimide ("PEI") that has been drawn from a heated preform into a long, thin fiber. The fiber may also be formed from polyetherimide ("PEI"), polycarbonate ("PC"), and other amorphous or semi-crystalline plastics. In embodiments, the fiber may be many milli-meters, meters or kilometers in length.

In the example embodiment of FIG. 1A, the fiber includes a central channel or opening 14 defined by a first wall 12. As shown in FIG. 1A, the opening 14 is rectangular. However, in other embodiments, the shape of opening 14 (and/or the other walls in the fiber) may be circular, oval, square, polygonal, or any regular or irregular geometric shape that can be defined by a preform used for drawing out the fiber. Preforms will be discussed in more detail below.

The fiber 10 also includes a second wall 18 that concentrically surrounds the first wall 12. Between the two walls are supporting structures 16 that hold the second wall 18 in place with respect to the first wall 12. The supporting structures 16 may be attached to the first wall 12 and/or the second wall 18 and may be positioned in a spaced arrangement around the first wall 12. In some instances, the supporting structures 16 may be evenly spaced. In other cases, they may be unevenly spaced. Both walls and the supporting structures may be formed from polymer as the fiber is drawn.

The supporting structures 16, inner wall 12, and outer wall 18 form a plurality of channels 20 (which may be referred to as void regions) that run along the length of the fiber. As illustrated in the figure, the cross-sectional shape of the channels 20 may be wholly or partially rectangular. In other embodiments, the cross-sectional shape of the channels 20 may be any regular or irregular shape. In embodiments, the cross-sectional shapes of channels 20 may match or substantially match. In embodiments, the cross-sectional shapes of some or all of the channels 20 may be different.

The channels 20 may be filled with a fluid (e.g. a gas or liquid) a gel, a solid, or a vacuum depending on the application. For example, if fiber 10 is used as a recuperative heat exchanger, then high-pressure fluid may flow through channels 20 in one direction and low-pressure fluid may flow through channel 14 in the other direction. Or, if fiber 10 is being used to thermally isolate opening 14 (and/or a material within opening 14) from the outside environment 22, the channels 20 may be filled with a thermally insulating material (e.g. a thermally insulating fluid) or with a vacuum.

Figure 1B:
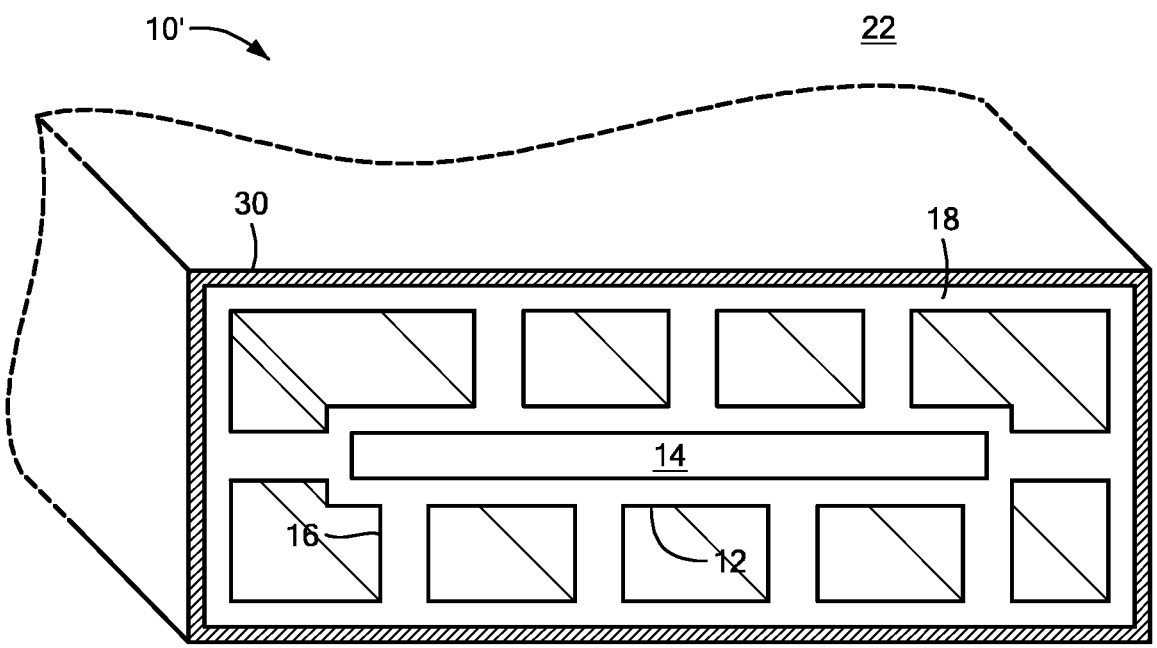
FIG. 1B is a cross-sectional view of an illustrative drawn fiber including a reflective layer disposed on one of the walls.

Referring to FIG. 1B, another embodiment of a drawn fiber 10' may include a central opening, inner wall, outer wall 18, and supporting structures 16. Additionally, fiber 10' may include a thermally reflective layer 30 placed on the outside surface of the outer wall 18. The thermally reflective layer 30 may be a metal foil or other material capable of reflecting radiant heat. Additionally/alternatively, the layer 30 may be a thermal insulator. It may be single sided so that it only reflects heat radiating onto one surface of the layer 30, or it may be double sided so that it reflects heat radiating onto both sides of the layer 30. Although shown on the outside surface of the outer wall 18, the thermally reflective layers may be placed on any surface such as the outer surface of outer wall 18, the inner surface of outer wall 18, the outer surface of inner wall 12, the inner surface of inner wall 12, and/or the surfaces of any of the supporting structures 16.

The thermally reflective layer 30 may provide additional thermal isolation to the fiber to further isolate inner wall 12 and/or opening 14 from the external environment 22, thus increasing the effectiveness of the thermal isolation.

In embodiments, central opening 14 may be filled with any type of material that requires thermal isolation from the external environment. As one example, the fiber could be used as a delivery mechanism for a fluid or gas that needs to maintain its temperature until it is delivered to a target area. Such applications could include, for example, medical procedures where hot or cold fluid is delivered to a surgical area of patient undergoing a procedure. As another example, a conductive wire or fiberoptic fiber could run through opening 14. Thermal isolation of the wire may be particularly useful in superconducting applications where the superconducting wire must be kept cold to maintain its superconducting qualities. In this example, it may also be advantageous to pump a coolant through some or all of the thermally isolating channels 20 to maintain the wire at superconducting temperatures.

Performance of fiberoptic cables can also be affected by temperature. Thus, a thermally isolating polymer fiber 10' may be able to improve or stabilize fiberoptic performance of a fiberoptic cable running through opening 14 by maintaining the cable at a stable temperature.

These applications are presented as examples of how the fiber may be used. There are, of course, not intended to be limiting; there may be many other applications for which the fibers described in this disclosure may be used.

Figure 2:
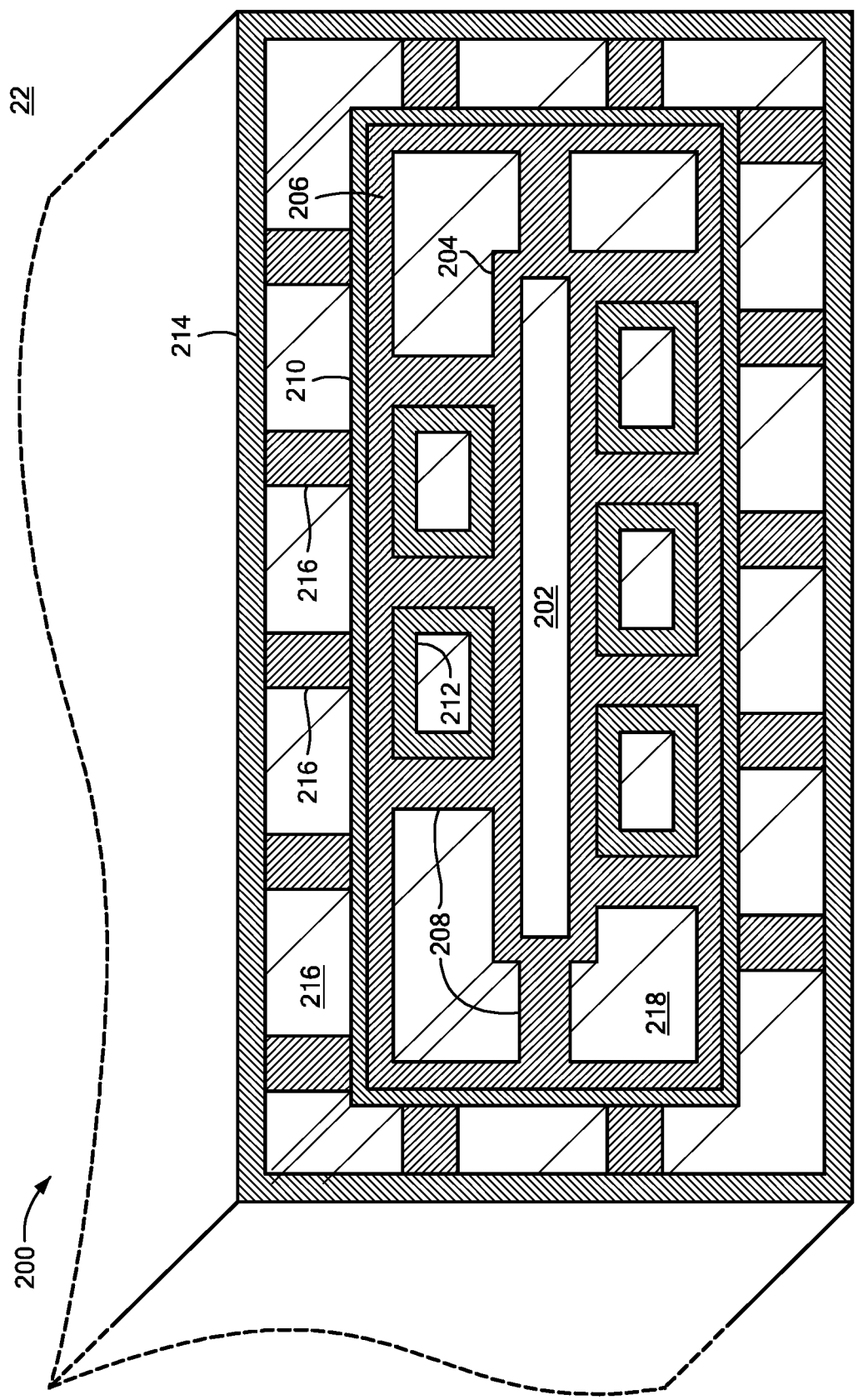
FIG. 2 is a cross-sectional view of a drawn fiber having multiple layered walls surrounding a central opening.

FIG. 2 is a cross sectional area of a drawn fiber with three concentric walls 204, 206, and 214. In this example embodiment, the walls define three concentric rectangular shapes. Like fiber 10 or fiber 10', fiber 200 includes a central opening 202 surrounded by an inner wall 204. A second wall 206 surrounds the inner wall 204 and is spaced apart from inner wall 204 by a set of supporting structures 208. Also, like fiber 10', fiber 200 includes a thermally reflective layer 210 disposed on at least one of the polymer walls. And as shown, fiber 200 may also include linings 212 on other polymer walls. The linings 212 may be thermally reflective linings, thermal insulating linings, linings that add structural strength, or any type of lining that can be formed along the polymer walls.

Fiber 200 also includes a third, concentric, outer wall 214 that surrounds both walls 204 and 206. This third wall is spaced apart from wall 206 by a second set of support structures 216 positioned between the middle wall 206 and the outer wall 214.

In the embodiment shown in FIG. 2, some or all of the first set of support structures 208 are offset from the second set of support structures 216. In other words, the support structures 216 between the middle wall 206 and the outer wall 214 do not line up with the support structures 208 between the inner wall 204 and the middle wall 206. However, other embodiments of fiber 200 may be constructed so that some or all of the support structures 208 between the middle wall 206 and the inner wall 204 line up with the some or all of the support structures 216 between the middle wall 206 and the outer wall 214.

The additional 214 and support structures 216 create another layer of channels (or voids) around the outside of middle wall 206. Thus, this embodiment includes an inner layer of channels 218 (i.e. a set of channels on the outer surface of inner wall 204) and an outer layer of channels 216 (i.e. a set of channels on the outer surface of middle wall 206) that surround the inner layer of channels 218. Having multiple layers of channels or voids can add additional thermal isolation between opening 202 and the outer environment 22.

Also, as noted above, the thermally insulating and/or reflecting layers may be placed on any surface of fiber 200. This includes the surfaces discussed above, and the inner and outer surfaces of outer wall 214 and the surfaces of the outer support structures 216.

Although shown with three concentric walls as an example, a fiber may be formed with fewer or more than three concentric walls.

Figure 3A:
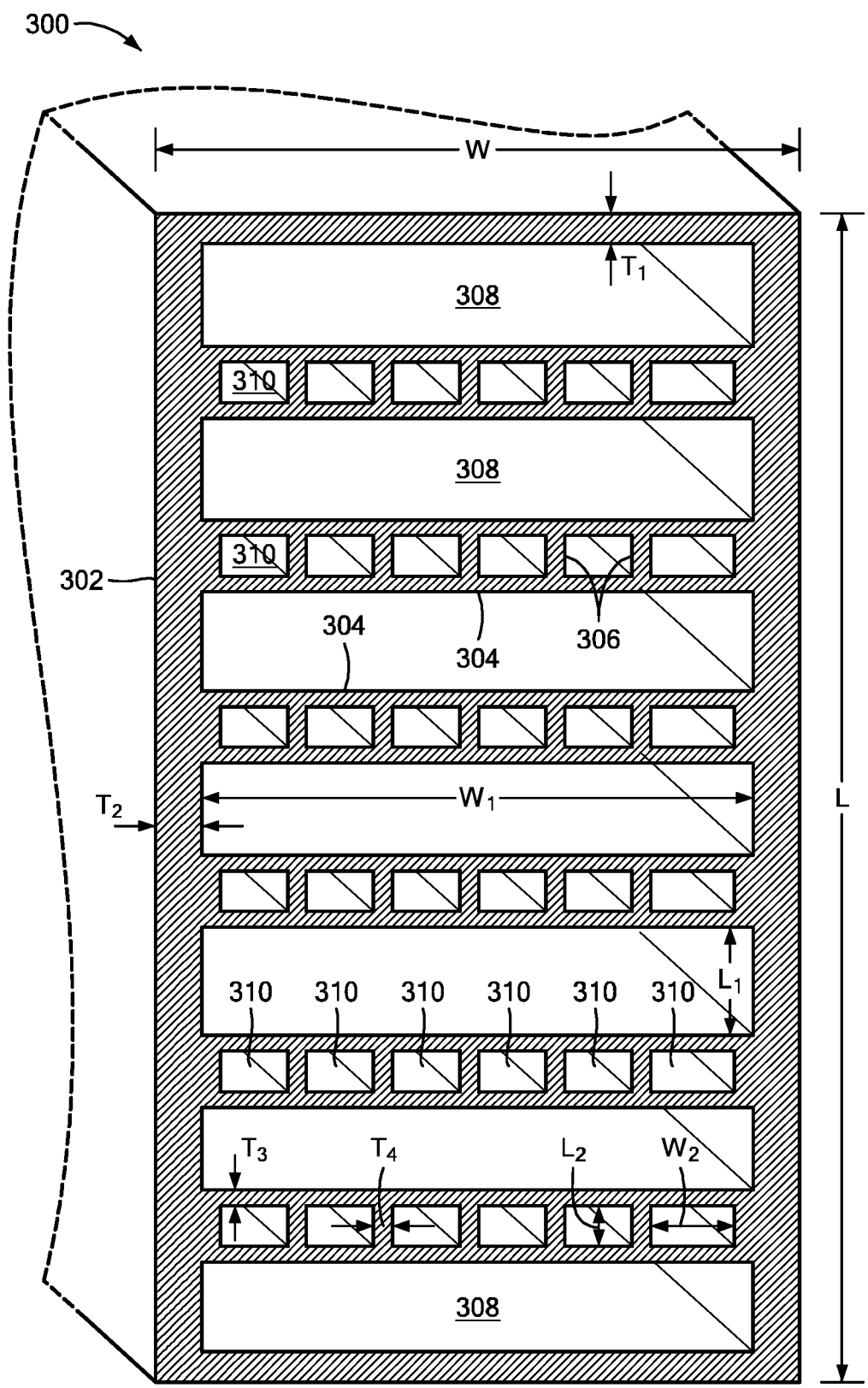
FIG. 3A is a cross-sectional view of a drawn fiber having multiple channels with different cross-sectional areas that can be used as a heat exchanger.

FIG. 3A illustrates a drawn fiber 300 that may be configured to operate as a heat exchanger. Fiber 300 includes an outer wall 302 and a series of inner walls 304 positioned horizontally within outer wall 302 to form fluid return channels 308. Separating walls 306 are spaced between at least some adjacent inner walls 304 to create fluid delivery channels 310. In embodiments, the fluid delivery channels 310 have a smaller cross-sectional area than the fluid return channels 308. These channels allow the heat exchanger fiber 300 to deliver fluid from a first end of the fiber to a second, opposite end of the fiber though the fluid delivery channels. In embodiments, the fluid may be a compressed gas, for example. Once the fluid reaches the second end of the fiber, the fluid can then expand and cool, contact or otherwise impinge upon a heat source and absorb heat from the heat source. The fluid can then flow back through the return channels 308 carrying the absorbed heat with it. In embodiments, the return channels have a volume selected such that the return fluid is at a pressure which is lower than the pressure of the fluid in the fluid delivery channels. In embodiments, the cross-sectional area of the fluid delivery channels is less than the cross-sectional area of the fluid return channels. In embodiments, the cross-sectional area of each individual fluid delivery channels is less than the cross-sectional area of each fluid return channel. In embodiments, the combined cross-sectional area of the fluid delivery channels (i.e., the sum of the cross-sectional areas of each individual fluid delivery channel) is less than the combined cross-sectional area of the fluid return channels (i.e., the sum of the cross-sectional areas of each of the one or more fluid return channels).

In embodiments, the cross-sectional areas of channels 308 and 310 could have cross-sectional areas that are equal or different. Channels 310 can be oriented parallel, perpendicular, or some other angle, to channels 308. The fluids flowing in channels 308 and 310 could be same or different. Channels 308 could have a fluid A flow from a first end of the fiber to a second end of the fiber. Channel 310 could have a fluid B which is at a different temperature from a second end of the fiber to a first end. In embodiments, both fluid A and fluid B could flow in the same direction or perpendicular. In embodiments, channels 308 could contain a static fluid that exchanges heat with a dynamic fluid flowing in channels 310.

As noted above, the length of each fiber can be many meters. Thus, when operating as heat exchanger, fiber 300 could be wrapped around, disposed or otherwise arranged through an item (e.g. a heat source) that requires cooling to produce effective heat transfer and refrigeration. In some instances, fiber 300 may be used in a cryogenic refrigeration application.

Figure 3B:
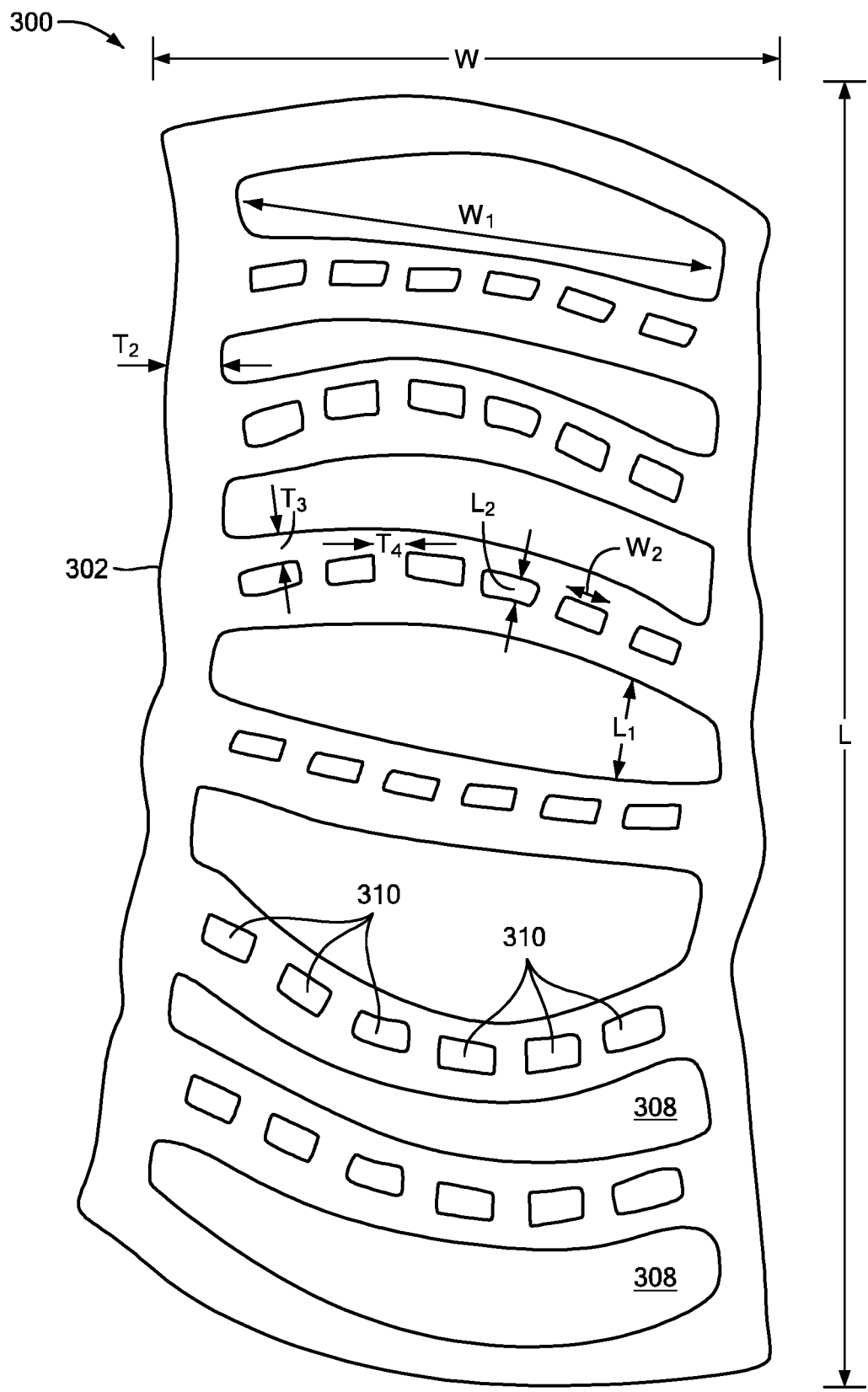
FIG. 3B is a photographic image of a cross-sectional view of a heat exchanger provided from a drawn fiber having multiple channels with different cross-sectional areas.

FIG. 3B is a photographic image of an example fiber 300. When formed, the length (L) dimension of outer wall 302 may be on the order of about 2.5-5 mm and the width W of the outer wall may be or the order of about by 2.5-5 mm. The openings of high-pressure channels 310 may have dimensions of $L_2$ by $W_2$, where $L_2$ may be about 75 µm and $W_2$ may be about 150 µm. The low-pressure return channels 308 may have dimensions $L_1$ by $W_1$, where $L_1$ may be about 200 µm and $W_1$ may be about 1500 µm. The thickness $T_1$ of the top and/or bottom outer wall 302 may be about 200 µm and the thickness $T_2$ of the left- and right-side outer wall 302 may be about 300 µm. The thickness $T_3$ of the inner walls may be about 50 µm. The thickness $T_4$ of the support structures 306 may be about 50 µm.

Figure 3C:
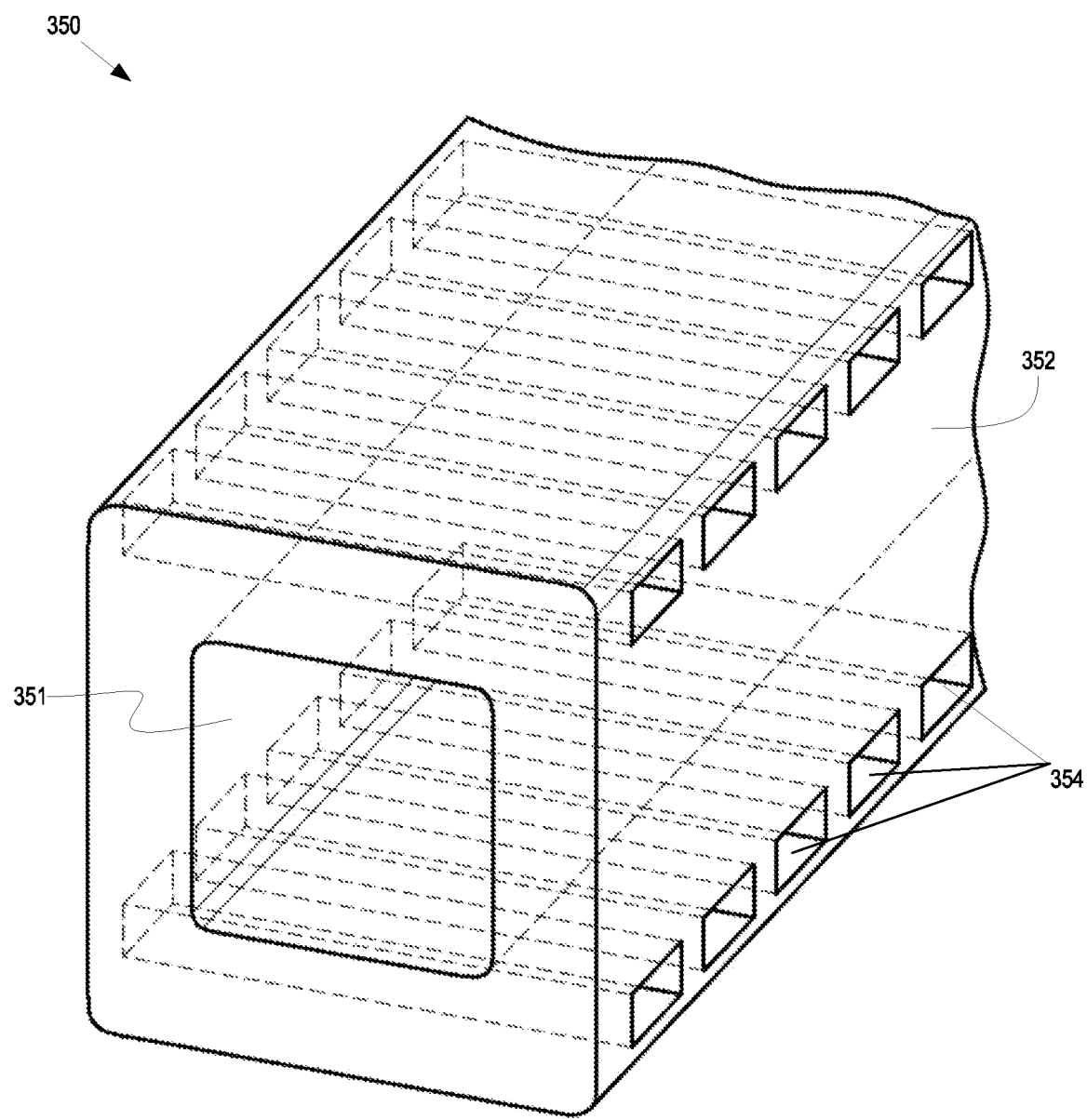
FIG. 3C is an isometric view of a cross-flow heat exchanger provided from a drawn fiber.

FIG. 3C illustrates a drawn fiber 350 that is configured to operate as a cross-flow heat exchanger. Fiber 300 includes a channel 351 that runs through a length of the fiber 350 and is surrounded by an outer wall 352. The channel 351 allows fluid to flow from one end of the fiber 350 to a second, opposite end of the fiber 350. One or more cross-channels 354 are formed through the outer wall in a direction that "crosses" channel 351. For example, the cross-channels 354 may be perpendicular to channel 351 as shown, or may be arranged at another any other angle that is not parallel to the channel 351 and that crosses channel 351. These channels allow fluid to flow through the fiber 350 in a crosswise direction relative to the fluid that flows in channel 351.

In embodiments, as the fluid flows, heat is conducted through the walls of the fiber 350 and exchanged from the fluid in channel 351 to the fluid in the cross-channels 354 (or vice versa). Thus, in a typical application, the fluid in channel 351 will be at a different temperature and/or pressure than the fluid in the cross-channels 354.

As noted above, the fluid may be a gas or liquid, for example. The volume of the channels may be chosen to allow for expansion or compression of the fluid and/or for the fluid changing state between liquid and gas forms.

Although shown with a single channel 351, the fiber 350 may have multiple channels like channel 351 that run along the length of the fiber. Similarly, although shown with multiple cross-channels 354, the fiber may include a single cross-channel. The cross channels 354 may be arranged parallel to each other, as shown, or at different angles. In some embodiments, at least some of the cross-channels 354 may take a curved or serpentine path through the fiber 350 as long as at least a portion of the cross-channels cross the central channel 351. Also, although shown at the top and bottom of the fiber, in embodiments, cross-channels 354 may run through side walls of the fiber 350. Additionally, channel 351 and the cross-channels 354 may have any appropriate cross sectional areas and are not limited in scale to what is shown in FIG. 3C.

Figure 4:
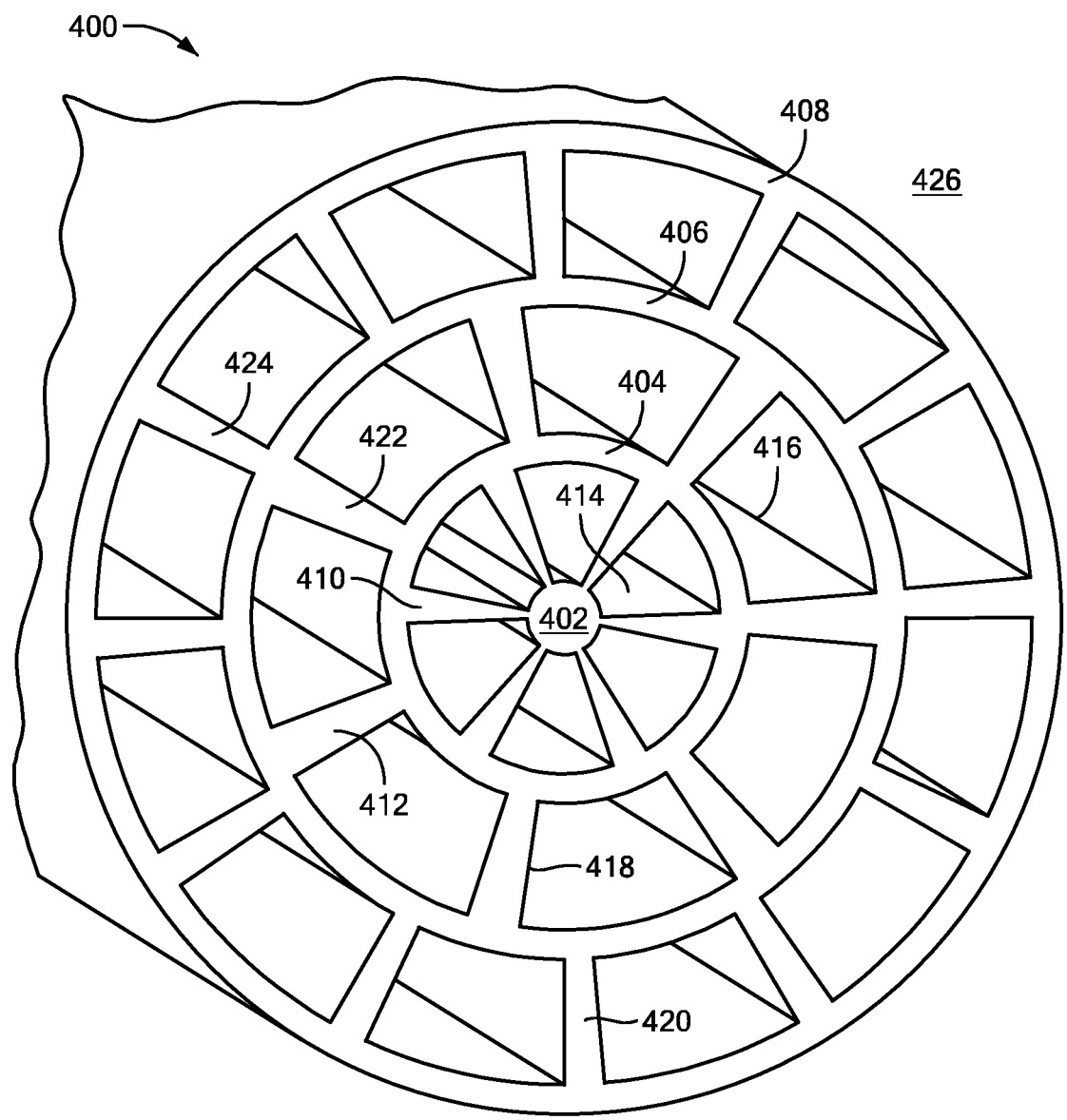
FIG. 4 is an isometric view of a portion of a drawn fiber having a circular cross-sectional area and a central element surrounded by concentric walls.

Referring to FIG. 4, shown is a drawn fiber 400 having a circular cross-sectional shape. Fiber 400 may include a central wire 402 which may be an electrical wire, a fiber optic wire, or any type of wire that can communicate data between a source and a receiver. In embodiments, central wire 402 may be formed from polymer. In other instances, central wire 402 may be glass, fiberglass, metal, or another material that can be used to carry signals.

The central wire 402 is surrounded by one or more concentric walls, such as inner wall 404, middle wall 406, and outer wall 408 which, in this embodiment, are concentric circles. However, in other embodiments, the walls may have a rectangular cross section, a triangular cross section, or a cross sectional shape with more than four sides. Between the walls are support structures 412 positioned radially (i.e. in line with a radius) from central wire 402. Some or all the support structures may be offset from one another, as illustrated by support structures 418 and 420. Alternatively, some or all the support structures may be in line with each other, like support structures 422 and 424.

Like the thermally isolating fiber 200 in FIG. 2, fiber 400 may thermally isolate the central wire 402 from an external environment 426. For example, the channels 414 and 416 may be vacuum-filled or filled with a thermally insulating gel, fluid, solid, or other material. In other embodiments, channels 414 and 416 may be filled with a thermally conductive material to thermally couple wire 402 with the external environment 426, if desired. In some instances, a thermal insulator may be pumped or otherwise disposed or arranged into the channels 416 (or the channels 416 may be vacuum filled) to thermally isolate wire 402 (or central opening 14 in FIG. 2) from the external environment 426, then a thermal conductor may be pumped into the channels 416 to thermally couple the wire 402 (or the central opening 14) with the external environment. This can be repeated in an alternating fashion to turn the channels into thermal insulators or thermal conductors and control the temperature of the central wire 402, if desired and appropriate for the application.

Figure 5:
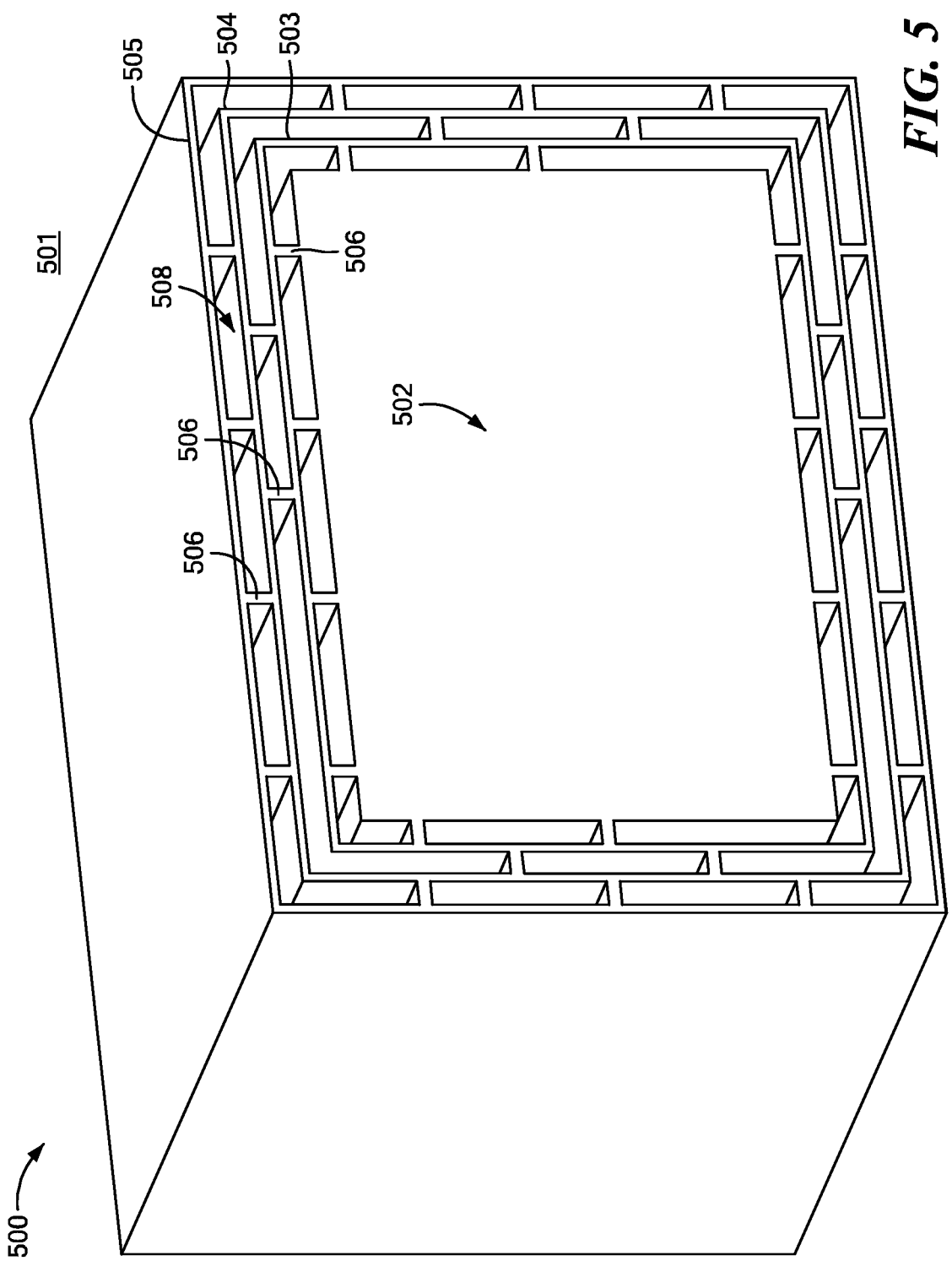
FIG. 5 is an isometric view of a portion of a drawn fiber having a rectangular cross-section area and a central element surrounded by concentric walls.

Turning to FIG. 5, a rectangular polymer fiber 500 may be configured to provide thermal isolation between a central area 502 and an external environment 501. Like fiber 400 and fiber 200, fiber 500 has one or more concentric walls 503, 504, 505 surrounding the central area 502. The walls 503, 504 and 505 are spaced apart and supported by support structures 506, which form a plurality of channels 508 that act to provide thermal isolation between the central area 502 and the external environment 504. Like the support structures in Like any of the fibers described in this disclosure, a thermal layer (such as a thermally reflective layer or a layer that provides additional thermal insulation described above) may be positioned on any of the surfaces of any of the walls and/or support structures. Also like the fibers described above, the channels 508 may be filled with a vacuum or a thermally insulating material.

Figure 6:
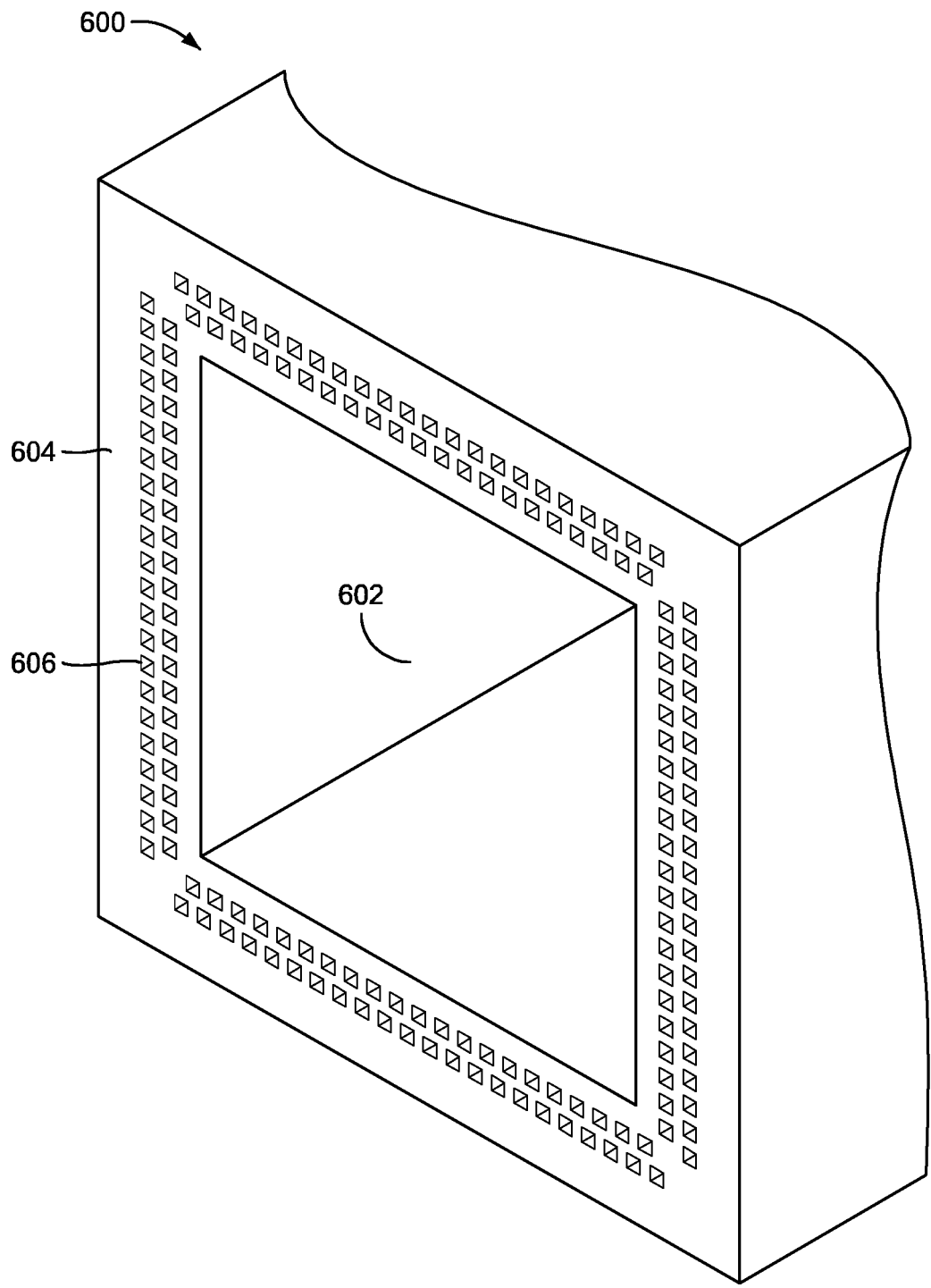
FIG. 6 is an isometric view of a portion of a drawn fiber that can be used as a heat exchanger.

Turning to FIG. 6, a polymer fiber 600 may be configured to act as a thermal exchanger. In this example, fiber 600 includes a central channel 602 surrounded by an outer wall 604. Smaller channels 606 run parallel to the central channel 602 through the outer wall. In embodiments, central channel 602 has a cross-sectional area which is larger than the cross-sectional area of channels 606. For example, when channels 602 and 606 are provided having substantially the same cross-sectional shape, the dimensions of channels 602 are larger than the dimensions of channels 606. For example, if channels 602 and 606 all have a substantially rectangular cross-sectional shape, then the length and width dimensions (as defined in FIG. 3A) of channel 602 are larger than the length and width dimensions of channels 606. Or as another example, if channels 602 and 606 all have a substantially circular cross-sectional shape, then the diameter of channel 602 are larger than the diameter of channels 606. It should, of course, be appreciated that in embodiments, it may be desirable or even necessary, for channels 602 and 606 to have different cross-sectional shapes. Also, channels 606 need not all have the same cross-sectional shape.

When used as a regenerative or condenser/evaporator thermal exchanger, relatively a fluid may flow through the smaller channels 606 to heat exchange with high heat capacity fluids or solids fixed in channel 602. The fixation can be a result of adsorption, physical boundaries, or some other means.

When used as a recuperative heat exchanger, the fiber 600 may be configured to allow heat to transfer from relatively smaller channels to the relatively larger channel through the walls of the fiber 600. Of course, the fiber could also be configured to allow heat to flow in the other direction, i.e. from the relatively larger channel to the relatively smaller channels, or flow between adjacent ones of the smaller channels, if desired.

Drawn fibers like fiber 600 may be used as recuperative, condenser/evaporator, or regenerative heat exchangers. For example, the polymer walls between the channels may be thermally resistive and/or may include thermally reflective material, as described above. This can thermally isolate the fluid delivery channels from the delivery return channels. In this instance, the fiber may be well suited for use as a condenser/evaporator heat exchanger that provides fluid to a thermal target, and the fluid absorbs or delivers heat to the thermal target. The channels of the fiber are configured to allow the fluid to return through the return path.

Alternatively, if the walls between the channels are configured to allow thermal conduction through the walls (for example, by reducing the width of the wall and/or by adding a thermally conductive layer to the wall), then the fiber may be well suited to act as a recuperative or regenerative heat exchanger. In this case, heat from relatively warmer fluid in at least some of the channels can be conducted through the polymer walls and absorbed by relatively cooler fluid in adjacent channels.

Also, when used as heat exchangers, the fibers may be configured as counter-flow exchangers where fluid in delivery channels flows in the opposite direction of fluid in the return channels, parallel-flow exchanger where the fluid in both channels flows in the same direction, cross-flow exchanger in which channels are aligned at an angle that is not parallel, or a regenerative exchanger in which the fluid flow oscillates though one set of channels.

Figure 7:
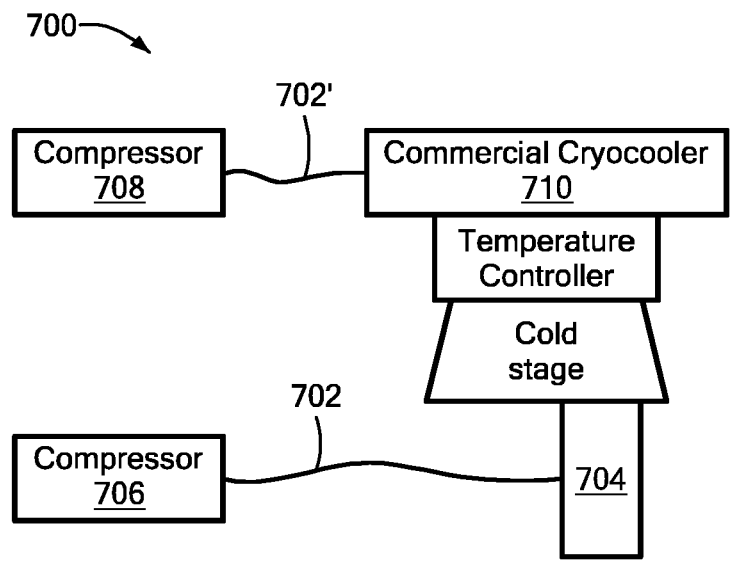
FIG. 7 is a block diagram of a heat exchanging system utilizing drawn fibers as heat exchangers.

Turning to FIG. 7, a refrigeration system 700 includes one or more drawn fiber Joule-Thomspon (JT) refrigerators 704 to reduce the achievable temperature of a commercial cryocooler. A JT refrigerator 704 consists of recuperative heat exchangers coupled with Joule-Thomson (JT) expansion valves. Compressor 706 generates the high pressure that flows though the high pressure element of interconnect 702 to the high pressure channels of JT fiber heat exchangers 704. The fluid expands through the JT valves 704 and returns to compressor 706 through the lower pressure channels 704 and low pressure element of interconnect 702. A commercial cryocooler can be represented by a coldhead 710, compressor 708, and interconnect 702'. As noted above, the JT refrigerator 704 can consist of multiple heat exchangers and expansion valves. These individual refrigerator system can be connected to the cold stage of the cryocooler in parallel, in series, and use different working fluids. In embodiments, the commercial cryocooler 710 can be replaces by joining JT refrigerators with different working fluids in series.

Figure 8:
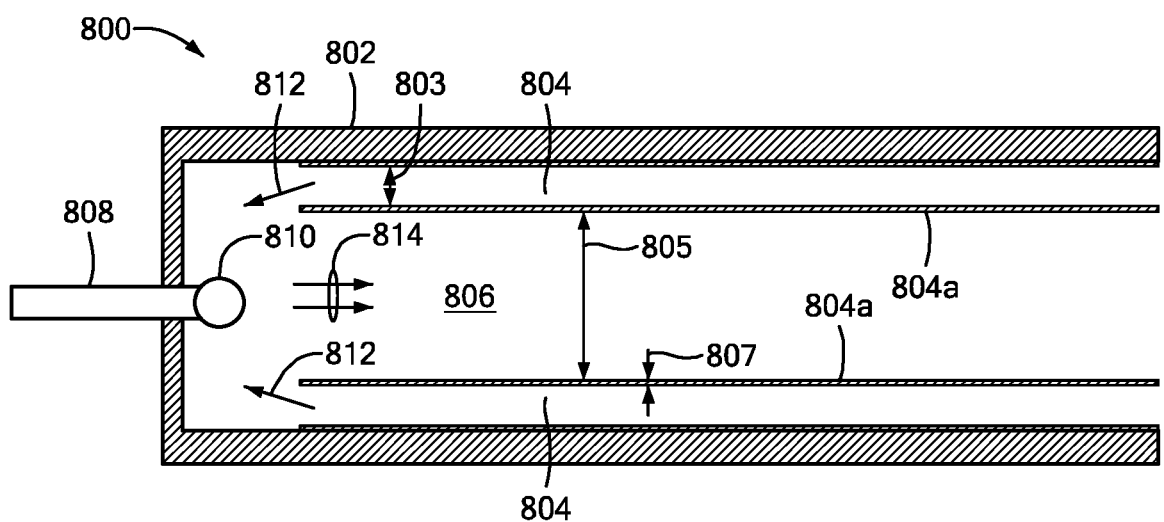
FIG. 8 is a lengthwise cross-sectional side view of a portion of a drawn fiber that can be used as a heat exchanger.

FIG. 8 is a lengthwise cross-sectional view of a drawn fiber 800 suitable for use as a regenerative thermal exchanger. Fiber 800 may be the same as or similar to fiber 600 shown in FIG. 6. Like the thermal exchange fiber 600 of FIG. 6, Fiber 800 includes an outer wall 802 and one or more channels 804 (here defined by a wall 804a) disposed or otherwise provided in or positioned near or in the outer wall 802. A channel 806 is formed in the center of the fiber 600. Channel 806 is larger than channels 804. In embodiments, channel 804 may function as a fluid supply channel and channel 806 may function as a fluid return channel. In embodiments, the fluid in channel 804 is at a pressure which is higher than the fluid in channel 806. Thus, channel 804 is sometimes referred to a high-pressure channel and channel 806 is sometimes referred to as a low-pressure channel.

A thermocouple 808 and evaporator 810 are coupled to the end of the fiber 800. In other embodiments, the relatively smaller channels 804 may be positioned in the center of the fiber 800 and the relatively larger return channel(s) 806 may be positioned near the outer wall 802 of the fiber 800.

In operation of one embodiment, compressed fluid flows through the high-pressure channels 804 (i.e. channels that may be used an/or configured to carry a relatively higher pressure fluid) toward the evaporator 810 in the direction of arrows 812. In some instances, the fluid in the high-pressure channels 804 may be a compressed gas or a liquid. When the fluid reaches the evaporator, the structure is configured to allow the fluid to expand and/or evaporate in the area of the evaporator 810. The fluid may absorb heat during the evaporation process. The heated (e.g. evaporated) fluid then flows back along the low-pressure return channel 806 (i.e. a channel that may be used and/or configured to carry a relatively lower pressure fluid) in the direction of arrows 814, carrying the absorbed heat away with it. In embodiments, the width W of the fiber's walls 802 may be about 0.2 mm, the width of the channels 804 may be between about 0.1-0.4 mm, and the width 805 of the return channel may be about 0.8 mm.

Figure 9:
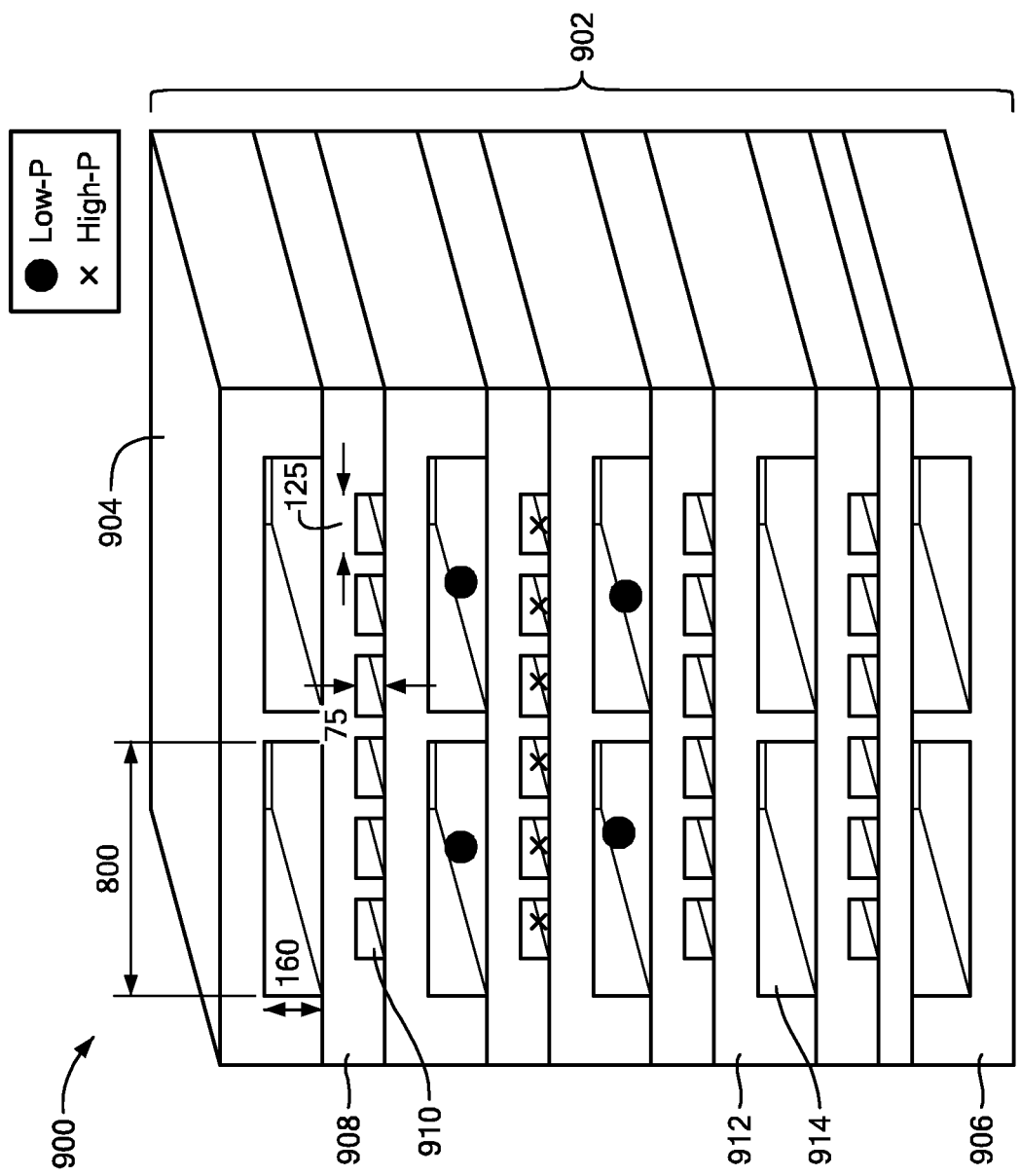
FIG. 9 is an isometric view of a fiber which can be used to form a fiber for use as a heat exchanger.

FIG. 9 is a cross-sectional or end view of a preform 900 that may be used to create a drawn fiber. Preform 900 may be used in fabrication of a heat-exchanger fiber (i.e. a fiber similar to fiber 300 in FIGS. 3 and 3A).

Preform 900 may be formed from a stack of machined polymer layers 902. For example, layers 904 and 906 may define the upper and lower portions of the outer wall. Layers such as layer 908 may include openings 910 that define the smaller, high-pressure channels that will be formed in the final fiber, and layers like layer 912 may include openings 914 that define the larger, low-pressure return channels that will be formed in the final fiber, as described above. In embodiments, the dimensions of the high-pressure openings 910 in preform 900 may be about 75×125 mm, and the dimensions of the low-pressure openings 914 may be about 160×800 mm.

In embodiments, polytetrafluoroethylene (Teflon®) spacers may be cut and placed into the channels of the preform to aid in preserving the channels during the consolidation process. Once the consolidation process is complete, the Teflon spacer may be removed. In embodiments, sacrificial material may be used to preserve the channels during consolidation and drawing. The sacrificial layer may be removed after consolidation or after drawing. In embodiments, no secondary material is used to preserve channels.

Figure 10:
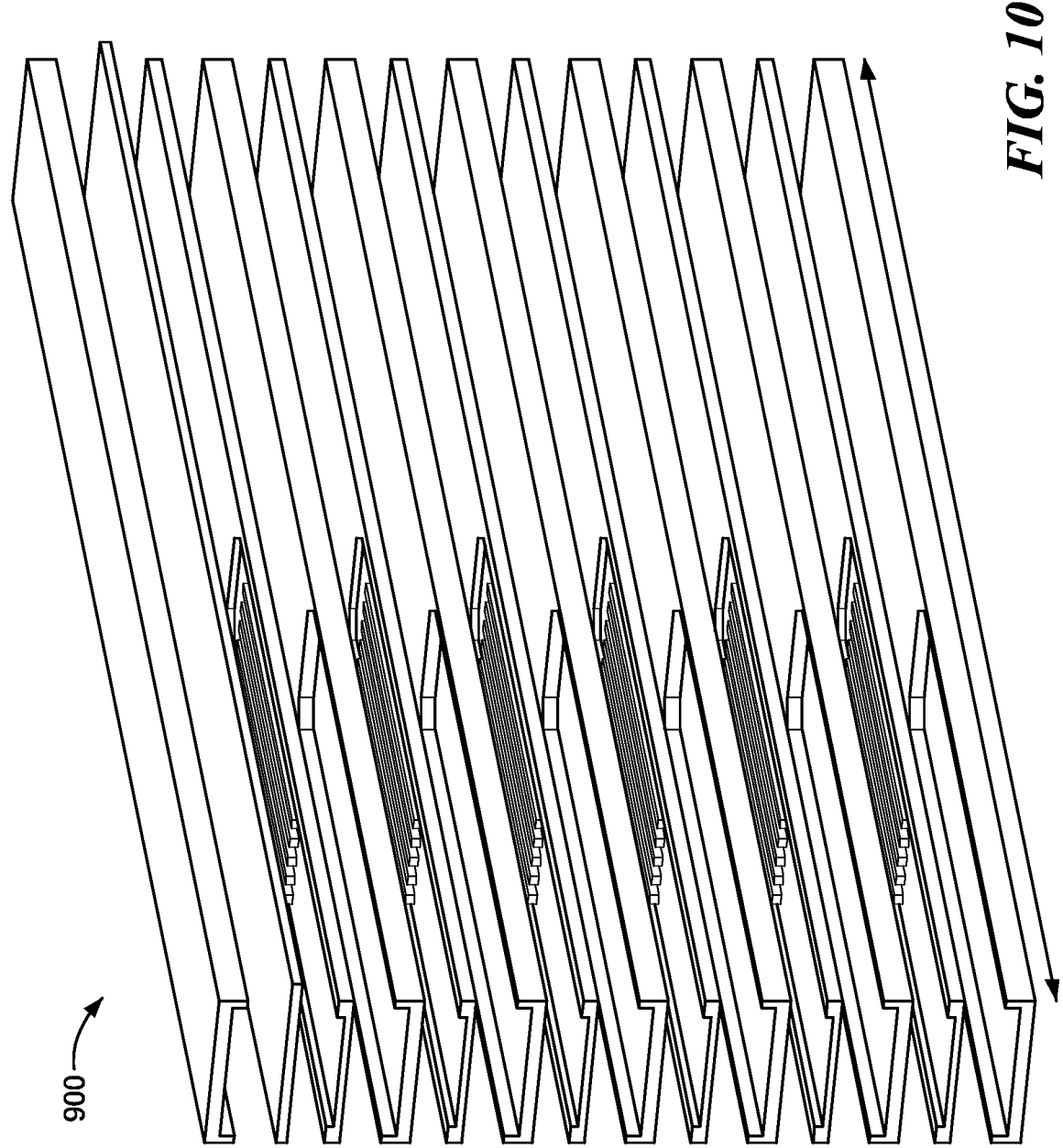
FIG. 10 is an exploded view of the fiber preform of FIG. 9.

FIG. 10 is an exploded view of preform 900 illustrating the individual polymer layers that are stacked together to form preform 900. In embodiments, each layer may be machined to form the openings for the channels that run through the fiber. The layers may then be stacked and joined together to form the fiber preform 900. As the layers are stacked together and Teflon or sacrificial spacers may be placed in the channels, the layers may be joined together in a hot press to create the preform. In embodiments, solvent welding, ultrasonic welding, or radio frequency (FR) welding may be used to join the layers.

Once the preform is drawn into a fiber, the low-pressure and high-pressure channels may be accessed separately. In other words, the large, low-pressure channels can be accessed from the sides of the fiber, while the small high-pressure channels are accessed from the ends of the fiber. Thus, as shown in FIG. 10, the low-pressure channels extend beyond the high-pressure channels in preform 1000 so that the low-pressure channels can be preferentially accessed from the sides. In embodiments, the low pressure channel can be physically blocked at the ends using epoxy, plugs, or other mechanical seals. The low pressure channels may be accessed by removing or displacing material on the exterior sides of the fiber to access the extended region. This can be achieved by techniques such as cutting, machining, and melting.

The high-pressure channels may be accessed at the ends the fiber. For example, a gas manifold may be coupled to the ends of the fibers to provide gas to the high-pressure channels. Since both the high-pressure and low-pressure channels are open at the ends, the low-pressure channels may be selectively blocked. To block the low-pressure channels, they are first accessed from the sides as previously described. Then, a low-viscosity epoxy may be placed onto the channel opening so that the epoxy wicks into the low-pressure channels only. As a result, the low-pressure channels are internally filled at either end of the fiber.

Figure 11:
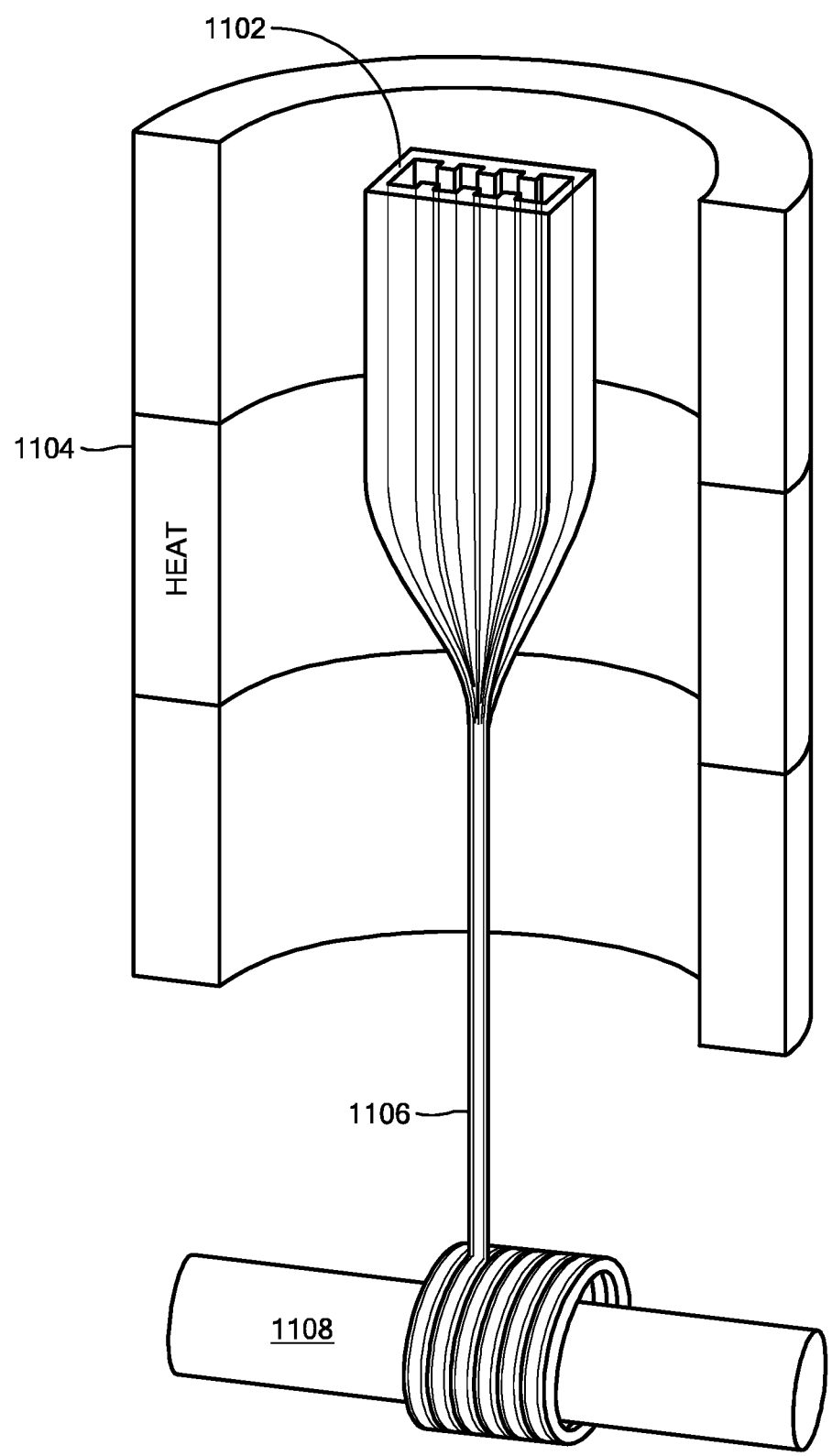
FIG. 11 is a diagram of a system for forming a drawn fiber from a preform.

FIG. 11 illustrates a system for fabricating drawn polymer fiber 1106 from a preform 1102. A fiber preform 1102 (which may be the same or similar to preform 900) is heated in an oven 1104. The preform is then pulled and drawn out by gravity or a pulling mechanism 1108. In this example, pulling mechanism 1108 is a spindle that rotates to draw the fiber. However, other pulling mechanisms may be used.

Figure 12:
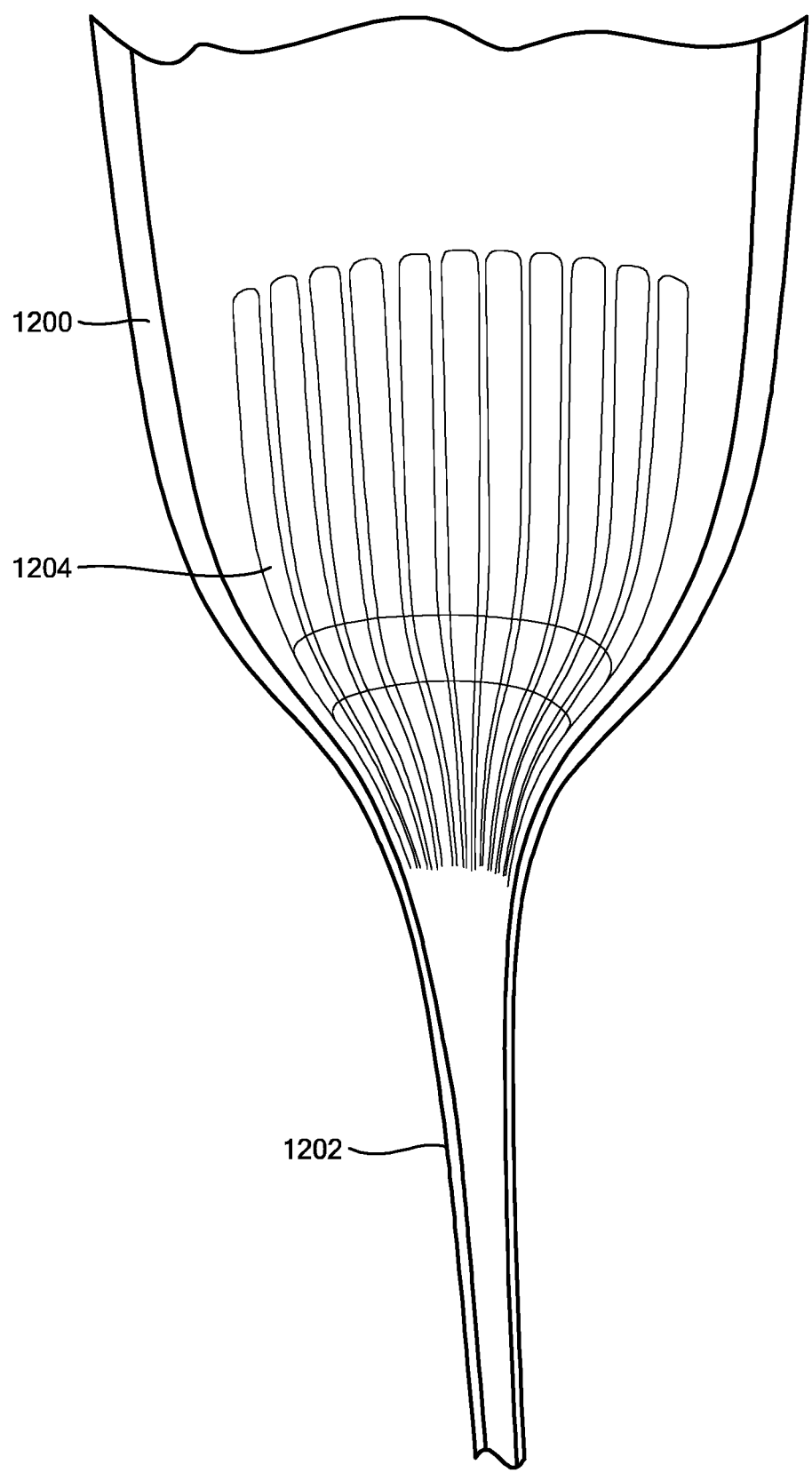
FIG. 12 is a photographic image of a polymer preform that has been drawn into a fiber.

FIG. 12 is a photographic illustration of a preform 1200 as it is being heated and drawn into a fiber 1202. Channels 1204 are visible in the heated polymer preform. These preform channels 1204 form the internal channels of the fiber 1202, such as channels 308 and 310 in FIG. 3 or any of the other channels described above in the various embodiments of fibers.

Although the description and figures above illustrate drawn fibers, other methods may be used to fabricate some, any, or all the fibers described in this document. For example, the fibers may be created using an extrusion process where polymer material is forced through a die, or other manufacturing processes that can produce polymer fibers.

It should be appreciated that in an effort to promote clarity in the description of the broad concepts sought to be protected herein, example embodiments have been described. However, after reading the description provided herein, those of ordinary skill in the art will appreciate that any of the channels described above may be filled with or may carry any appropriate material. For example, if the channels are filled with a static (i.e. non-flowing) material, that material may be a fluid (i.e. gas or liquid), a gel, a solid, a composite material, etc. If the channels are filled with a flowing material, that material may be a fluid (i.e. gas or liquid), a granular material, a gel, a composite material, or any other material that can flow through the channel. As described above, the channels may also be filled with a vacuum.

Those of ordinary skill in the art will appreciate that the various embodiments described above are shown, by way of example, with specific shapes. However, this is not a requirement. Any of the fibers described herein may have any regular or irregular cross-sectional shape. Likewise, any of the channels described above may have any regular or irregular cross-sectional shapes. Also, the cross-sectional shapes of any fiber or channel do not need to match. For example, a fiber with an outer wall having a rectangular cross-sectional shape may have internal channels with circular, rectangular, and/or any other cross-sectional shapes. Also, any structural characteristics of fiber or channels described herein in connection with a specific example embodiment may be used in any of the other embodiments described herein Accordingly, it should be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

The invention claimed is:

1. A heat exchanger comprising:
a polymer fiber having a first end and a second end, the polymer fiber comprising: one or more fluid delivery channels disposed along a length of the polymer fiber between the first and second ends, the one or more fluid delivery channels configured to carry a fluid having a first temperature from the first end to the second end, wherein the polymer fiber is a single, polymer fiber having an outer wall and having a uniform cross-section along the entire length of the single polymer fiber from the first end of the single, polymer fiber to the second end of the single polymer fiber; and
one or more fluid return channels disposed along the length of the polymer fiber with at least one or some of the fluid return channels extending between the first and second ends and configured to return a fluid from the second end of the polymer fiber, wherein the one or more fluid delivery channels have a first size and shape which define a first cross-sectional area and the one or more fluid return channels have a second size and shape which define a second cross-sectional area.

2. The heat exchanger of claim 1 wherein:
each of the one or more fluid delivery channels and each of the one or more fluid return channels extend along the entire length of the polymer fiber from the first end of the polymer fiber to the second end of the polymer fiber; and
an outer wall with a uniform cross-section along the length of the fiber.

3. The heat exchanger of claim 1 wherein the one or more fluid delivery channels and the one or more fluid return channels are provided having a generally rectangular cross-sectional shape.

4. The heat exchanger of claim 1 further comprising a static material disposed in at least one of the one or more fluid delivery channels to entirely fill the one or more fluid delivery channels wherein the static material corresponds to one or more of:
a gas;
a gel;
a solid; and
a composite material.

5. The heat exchanger of claim 1 further comprising a static material disposed in one or more fluid return channels wherein the static material fills the one or more fluid return channels and the static material corresponds to one or more of:
a gas;
a granular material;
a gel; and
a composite material.

6. The heat exchanger of claim 1 further comprising a material disposed in one or more of the one or more fluid delivery channels, wherein the material fills the one or more fluid delivery channels and the material corresponds to one or more of:
a gas;
a granular material;
a gel; and
a composite material.

7. The heat exchanger of claim 1 further comprising a material disposed in one or more of the one or more fluid return channels, wherein the material fills the one or more fluid return channels and the material corresponds to one or more of:
a gas;
a granular material;
a gel; and
a composite material.

8. A heat exchanger comprising:
a polymer fiber having a first end and a second end, the polymer fiber comprising:
one or more fluid delivery channels disposed along a length of the polymer fiber between the first and second ends, the one or more fluid deliver channels configured to carry a fluid having a first temperature from the first end to the second end, wherein the polymer fiber is a single, polymer fiber having an outer wall and having a uniform cross-section and wherein the outer wall extends along the entire length of the single polymer fiber from the first end of the single polymer fiber to the second end of the single polymer fiber, and
one or more fluid return channels disposed along the length of the polymer fiber with at least one or some of the fluid return channels extending between the first and second ends and configured to return a fluid from the second end of the polymer fiber.

9. The heat exchanger of claim 8 further comprising a material disposed in one or more of the one or more fluid return channels, wherein the material fills the one or more fluid return channels and the material corresponds to one or more of:
a gas;
a granular material;
a gel; and
a composite material.

10. The heat exchanger of claim 8 wherein:
each of the one or more fluid delivery channels and each of the one or more fluid return channels extend along the entire length of the polymer fiber from the first end of the polymer fiber to the second end of the polymer fiber; and
an outer wall with a uniform cross-section along the length of the fiber.

11. The heat exchanger of claim 8 wherein the one or more fluid delivery channels and the one or more fluid return channels are provided having a generally rectangular cross-sectional shape.

12. The heat exchanger of claim 8 further comprising a static material disposed in at least one of the one or more fluid delivery channels to entirely fill the one or more fluid delivery channels wherein the static material corresponds to one or more of:
- a gas;
- a gel;
- a solid; and
- a composite material.

13. The heat exchanger of claim 8 further comprising a static material disposed in one or more fluid return channels wherein the static material fills the one or more fluid return channels and the static material corresponds to one or more of:
- a gas;
- a granular material;
- a gel; and
- a composite material.

14. A heat exchanger comprising:
a polymer fiber having a first end and a second end, the polymer fiber comprising:
one or more fluid delivery channels disposed along a length of the polymer fiber between the first and second ends, the one or more fluid delivery channels configured to carry a fluid having a first temperature from the first end to the second end, with the polymer fiber having an outer wall and having a uniform cross-section along the entire length of the polymer fiber from the first end of the polymer fiber to the second end of the polymer fiber; and
one or more fluid return channels disposed along the length of the polymer fiber with at least one or some of the fluid return channels extending between the first and second ends and configured to return a fluid from the second end of the polymer fiber.

15. The heat exchanger of claim 14 wherein:
each of the one or more fluid delivery channels and each of the one or more fluid return channels extend along the entire length of the polymer fiber from the first end of the polymer fiber to the second end of the polymer fiber; and
an outer wall with a uniform cross-section along the length of the fiber.

16. The heat exchanger of claim 14 wherein the one or more fluid delivery channels and the one or more fluid return channels are provided having a generally rectangular cross-sectional shape.

17. The heat exchanger of claim 14 further comprising a static material disposed in at least one of the one or more fluid delivery channels to entirely fill the one or more fluid delivery channels wherein the static material corresponds to one or more of:
- a gas;
- a gel;
- a solid; and
- a composite material.

18. The heat exchanger of claim 14 further comprising a static material disposed in one or more fluid return channels wherein the static material fills the one or more fluid return channels and the static material corresponds to one or more of:
- a gas;
- a granular material;
- a gel; and
- a composite material.

19. A heat exchanger comprising:
a single polymer fiber having a first end, a second end, an outer wall and having a uniform cross-section along the entire length of the single polymer fiber from the first end of the single polymer fiber to the second end of the single polymer fiber, the single polymer fiber comprising:
one or more fluid delivery channels disposed in the single polymer fiber, the one or more fluid delivery channels configured to carry a fluid having a first temperature; and
one or more fluid return channels disposed in the single polymer fiber, the one or more fluid return channels configured to return a fluid from the second end of the single polymer fiber wherein the one or more fluid delivery channels and the one or more fluid return channels are either parallel or perpendicular to each other in the single polymer fiber.

20. The heat exchanger of claim 19 wherein the single polymer fiber comprises:
a first wall comprising a polymer, the first polymer wall having an inner surface and an outer surface with the inner surface defining a first opening in the single polymer fiber, the first opening corresponding to one of:
one of the one or more fluid delivery channels; or
one of the one or more fluid return channels;
a second wall comprising a polymer, the second polymer wall having an inner surface and an outer surface with the inner surface spaced apart from and substantially concentrically surrounding the outer surface of the first polymer wall;
one or more supporting structures coupled between the first polymer wall and the second polymer wall, the one or more support structures having a size and shape selected to space the inner surface of the second polymer wall from the outer surface of the first polymer wall and to define one or more thermally insulating channels between the inner surface of the second polymer wall and the outer surface of the first polymer wall wherein at least one of the one or more thermally insulating channels are configured to thermally isolate at least a portion of the first opening in the single polymer fiber from an external environment.

21. The heat exchanger of claim 20 further comprising a third polymer wall concentrically surrounding the second polymer wall.

22. The heat exchanger of claim 21 further comprising one or more second supporting structures coupled between the second polymer wall and the third polymer wall, the one or more second support structures configured to space the third polymer wall from the second polymer wall to define one or more insulating channels between an inner surface of the third polymer wall and an outer surface of the second polymer wall.

23. The heat exchanger of claim 20 further comprising a thermally reflective material disposed on a surface of the first wall.

24. The heat exchanger of claim 23 wherein the thermally reflective material disposed on the surface of the first wall distal to the opening.

25. The heat exchanger of claim 24 wherein the thermally reflective material is disposed on the surface of the first wall proximal to the opening.

26. The heat exchanger of claim 20 wherein the first wall comprises one of:
a cryogenic fiber, and
a conductive wire.

27. The heat exchanger of claim 20 wherein the single polymer fiber is a drawn polymer fiber.

\* \* \* \* \*